Figure 1:
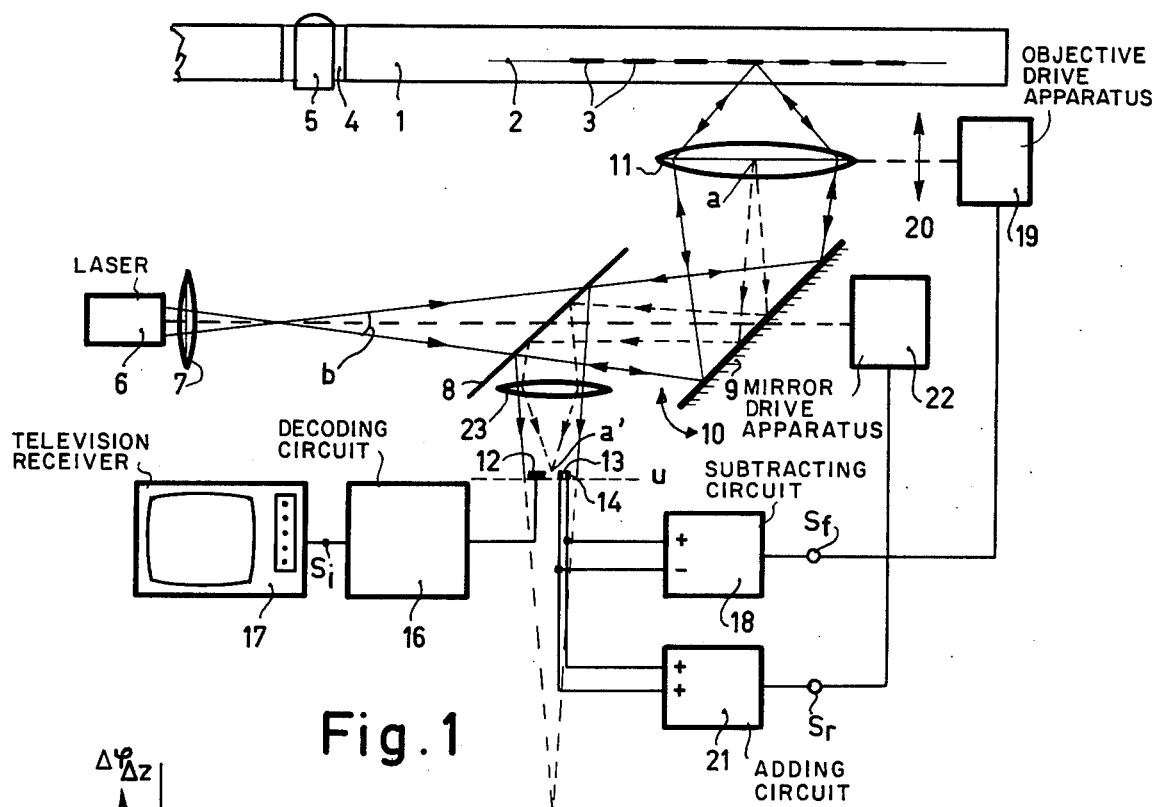

United States Patent [19]

Bouwhuis et al.

[11] 4,006,293
[45] Feb. 1, 1977

[54] APPARATUS FOR READING A FLAT RECORD CARRIER WITH AN OPTICALLY READABLE INFORMATION STRUCTURE

[75] Inventors: Gijsbertus Bouwhuis; Josephus Johannes Maria Braat; Peter Ferdinand Greve; Kornelis Antonie Immink, all of Eindhoven, Netherlands

[73] Assignee: U.S. Philips Corporation, New York, N.Y.

[22] Filed: Apr. 16, 1975

[21] Appl. No.: 568,727

[30] Foreign Application Priority Data

Feb. 28, 1975 Netherlands .................. 7502373

[52] U.S. Cl. .................. 358/128; 179/100.3 V; 179/100.3 G
[51] Int. Cl.² .................. H04N 5/76; G11B 7/12
[58] Field of Search ....... 178/6.6 R, 6.6 DD, 6.7 A, 178/6.6 TP; 179/100.3 V, 100.3 G, 100.4 R; 250/201–202, 203 R, 550, 552, 206, 555, 563; 340/173 LM, 173 LT

[56] References Cited

UNITED STATES PATENTS

| | | |
|---|---|---|
| 3,913,076 | 10/1975 | Lehureau et al. .......... 179/100.3 G |
| 3,919,465 | 11/1975 | Holler et al. .................. 178/6.6 R |

Primary Examiner—Raymond F. Cardillo, Jr.
Attorney, Agent, or Firm—Frank R. Trifari; Simon L. Cohen

[57] ABSTRACT

An apparatus is described for reading a flat record carrier on which information is stored in an optically readable track-shaped information structure. By the arrangement in the far field of the information structure and at one side of a plane which is formed by the optical axis of an objective system which is used for reading and a line parallel to the center line of the track portion to be read, of a radiation-sensitive detection system which consists of at least two detectors in approximately the position $\beta/2$, $\beta$ being the angle at which a first-order beam is diffracted in the lateral direction of the tracks, centering and focussing errors can be detected without the use of auxiliary beams and additional optical elements.

10 Claims, 23 Drawing Figures

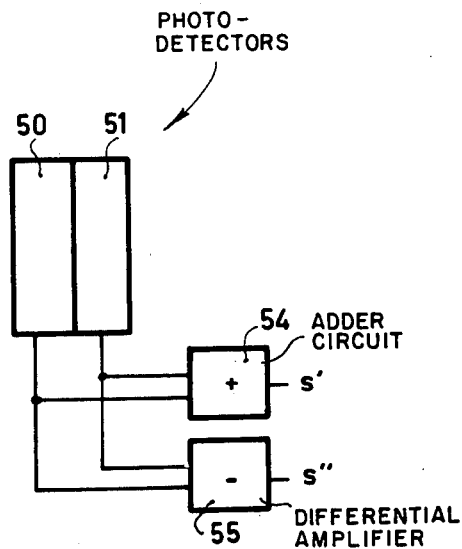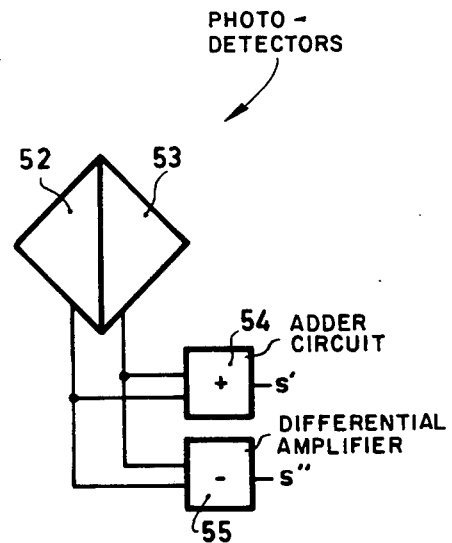
Fig. 14a  Fig. 14b
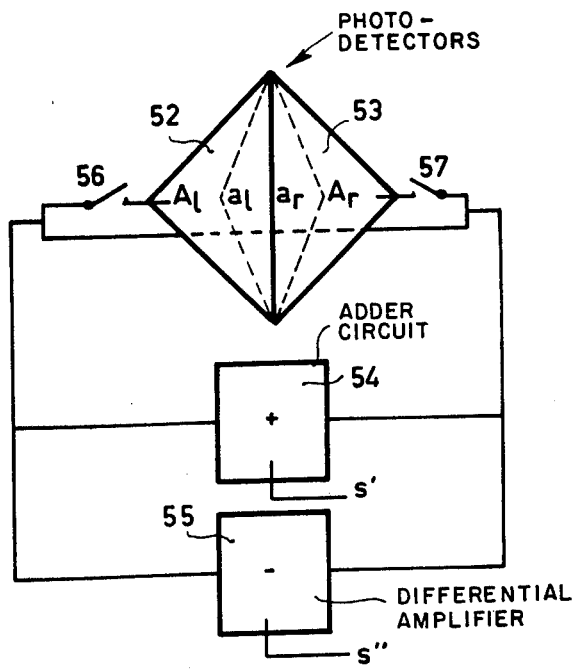
Fig. 15

APPARATUS FOR READING A FLAT RECORD CARRIER WITH AN OPTICALLY READABLE INFORMATION STRUCTURE

The invention relates to an apparatus for reading a flat record carrier on which information, for example video and/or audio information, is recorded in an optically readable track-shaped, information structure, which apparatus comprises a radiation source, an objective system for supplying radiation from the radiation source via the record carrier to a radiation-sensitive information detection system, which detection system converts the read beam which is supplied by the radiation source and modulated by the information structure into an electric signal, and which apparatus further comprises a focussing detection system and a centering detection system, which systems are connected to electronic circuits for deriving control signals for correcting the focussing of the objective system and, respectively, the centering of the read beam relative to a track portion to be read.

A focussing detection system is to be understood to mean a detection system which supplies an electrical signal which provides an indication of a deviation between the plane of focussing of the objective system and the plane of the information structure to be read. A radiation-sensitive centering detection system supplies a signal which provides an indication of deviations between the center of a read spot of radiation which is projected on the information structure and the center of the track to be read.

In: "Philips' Technical Review" 33, no. 7, pages 186 – 197 an apparatus is described for reading a round disc-shaped record carrier. In the record carrier a color television program is stored. The information structure consists of a spiral track which consists of a multitude of pits which are pressed in the record carrier, the luminance information being contained in the frequency of the pits and the chrominance and sound information being contained in a variation of the lengths of the pits. A read beam is focussed onto the information structure so as to obtain a radiation spot whose dimensions are of the order of magnitude of those of the pits. By moving the record carrier relative to the read beam, said beam is intensity-modulated in accordance with the stored information. A radiation-sensitive information detector converts the modulation of the read beam into an electric signal. In an electronic circuit said signal is processed in such a manner that it is suitable to be applied to a color television receiving apparatus.

During reading of the record carrier care must be taken that the center of the read spot of radiation is always projected in the center of the track to the read, because otherwise cross-talk between adjacent tracks may occur and the modulation depth of the signal which is supplied by the information detector becomes too small. Therefore, the position of the radiation spot must be detected and corrected continually. The objective system which is employed in the read apparatus has a high numerical aperture and a small depth of focus. Therefore, it is always necessary to focus sharply on the information structure. Deviations between the desired position of the plane of focussing and the actual position of the plane, which may for example result from errors in the bearing of the record carrier or warping of the record carrier or vibrations of the elements of the read apparatus, must be detected continually and the focussing must be readjusted with the aid thereof.

The apparatus described in the cited article comprises two separate auxiliary systems for detecting centering errors and focussing errors. In the centering auxiliary system two sub-beams are produced which are focussed on the edge of the track to be read. For each of the sub-beams a separate auxiliary detector is provided. The focussing auxiliary system consists of a plate of an electrically conducting material which is connected to the objective system, which plate constitutes a capacitance in conjunction with the electrically conductive surface of the record carrier, and an electronic circuit for measuring the capacitance value. In the prior apparatus, in addition to the optical elements required for the actual read operation, a substantial number of auxiliary elements are required for detecting centering and focussing errors.

It is an object of the present invention to provide a read apparatus in which centering and focussing errors can be detected with a minimal number of additional optical elements. The apparatus according to the invention is characterized in that the centering detection system and the focussing detection system are constituted by a system of at least two radiation-sensitive detectors, which system is disposed in the far field of the information structure at one side of a plane which is formed by the optical axis of the objective system and a line which is parallel to the center line of the track portion to be read, which system is situated in an area around the point where the line which makes an angle of $\beta/2$ with the optical axis intersects the plane of the detectors, where $\beta$ is the angle at which a first-order beam is diffracted in the lateral direction of the tracks.

The detectors may be disposed in the actual exit pupil of the objective system if said pupil is readily accessible, or in an image formed with an auxiliary lens, or by a shadow image of the actual pupil if said pupil is not readily accessible. The detectors are always located in a plane where the different diffraction orders can satisfactorily be distinguished, i.e. in a plane which is sufficiently remote from the image of the information structure. This is what is meant by the expression: the detectors are disposed in the "far field" of the information structure.

The invention is based on the recognition that when the record carrier, which may be regarded as a two-dimensional diffraction grating, is read, centering and focussing errors result in additional phase shifts between the zero-order beam and higher-order beams. Said phase shifts are visible in said "far field" as a pattern of interference lines, whose period which is determined by the focussing, and whose phase, which is determined by the centering, can be measured. The centering and focussing errors can be detected with the aid of additional detectors only and without any further optical elements or auxiliary beams. With the aid of the resulting error signals the centering and focussing of the read beam can be readjusted so that no interference lines appear anymore and the radiation intensity in the plane of the detectors has a specific level.

The invention will now be described in more detail with reference to the drawing, in which:

FIG. 1 shows a preferred embodiment of an apparatus according to the invention,

FIGS. 2, 3, 4a through 4D and 5 through 11 illustrate the principle of the invention, and FIGS. 12a, 12b, 13a, 13b, 14a, 14b, and 15 through 17 show different detector arrangements according to the invention.

FIG. 1 shows a round disc-shaped record carrier 1 in radial cross-section. The plane of the information structure is assumed to be reflecting and is designated 2. The information tracks are denoted by 3. A radiation source 6, for example a helium-neon laser, emits a read beam b. Said beam is reflected by the mirror 9 to an objective system 11, which is schematically represented by a single lens. The path of the read beam includes an auxiliary lens 7 which ensures that the exit pupil completely fills the pupil of the objective system. In that case a radiation spot of minimal dimensions is projected onto the plane of the information structure.

The read beam is reflected by the information structure and, as the record carrier is rotated about a spindle 5 which projects through a central opening 4, is modulated in time in accordance with the information which is stored in the track to be read. The modulated read beam passes through the objective system again and is reflected by the mirror 9 in the direction of the beam which is emitted by the source. The radiation path of the read beam includes elements for separating the paths of the modulated and unmodulated read beams. Said elements may for example consist of an assembly of a polarization-sensitive dividing prism and a λ/4 plate. In FIG. 1 it has been assumed for the sake of simplicity that said means are formed by a semi-transparent mirror 8. Said mirror reflects a part of the modulated read beam to a radiation-sensitive detector 12. At the output of said detector an electric signal is obtained in accordance with the information which is stored in the track to be read. This signal is decoded in an electronic circuit 16, so that an information signal $S_i$ is obtained, which can be applied to a conventional television receiving apparatus 17.

The optical details of the information structure are very small. As an example, the width of a track is 0.6μm and the track spacing 1.6μm and the average length of the information areas, which hereinafter are assumed to be pits, is 2μm for a disc-shaped record carrier on which a television programme of 30 minutes duration is recorded within a ring with an inner diameter of 12 cm and an outer diameter of 27 cm. The read spot must therefore remain very accurately centered on the track to be read, and the read beam must always remain sharply focussed on the plane of the information structure.

In order to be able to detect centering and focussing errors two additional detectors 13 and 14 are provided apart from the detector 12. These three detectors are for example disposed in the plane u in which the actual exit pupil of the objective system is imaged with the aid of an auxiliary lens 23, which is shown dotted. For convenience only the image a' of a point a of the exit pupil is indicated in FIG. 1 with dotted lines. The detectors may also be disposed in a different plane provided that the different diffraction orders can suitably be distinguished in said plane. Generally, it is assumed that the detectors are disposed in the "far field" of the information structure.

The signals supplied by the detectors 13 and 14 can be added and further processed in an electronic circuit 21. At the output of said circuit a control signal $S_r$ is obtained which is applied to a schematically shown drive means 22, known per se, which is capable of tilting the mirrors 9 (compare the arrow 10 in FIG. 1).

The electric signals from the detectors 13 and 14 can moreover be applied to an electronic circuit 18 in which they are subtracted from each other and further processed to a control signal $S_f$. Said control signal may for example be applied to an also schematically shown device 19, known per se, for moving the objective system in a vertical direction (compare the arrow 20 in FIG. 1).

Now the influence of focussing and centering errors on the signals supplied by the detectors 13 and 14 will be discussed. For simplicity it will then be assumed that the record carrier is radiation-transmitting. However, the following considerations also apply to a radiation-reflecting record carrier.

Figure 2:
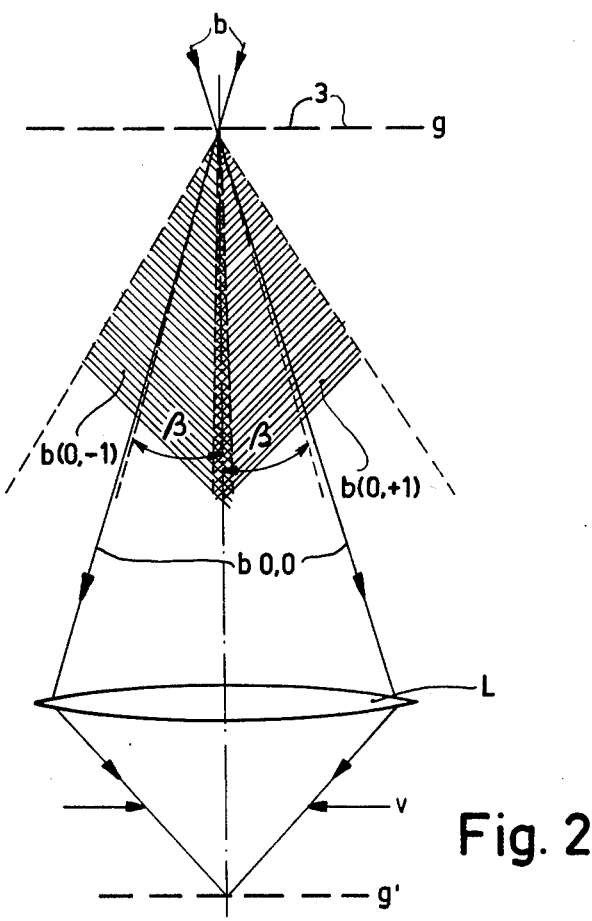

The information structure of the record carrier which consists of tracks, which in their turn consist of a multitude of short areas, may be regarded as a two-dimensional diffraction grating. FIG. 2 shows a part of said grating in accordance with a cross-section in the lateral direction of the tracks 3.

Figure 3:
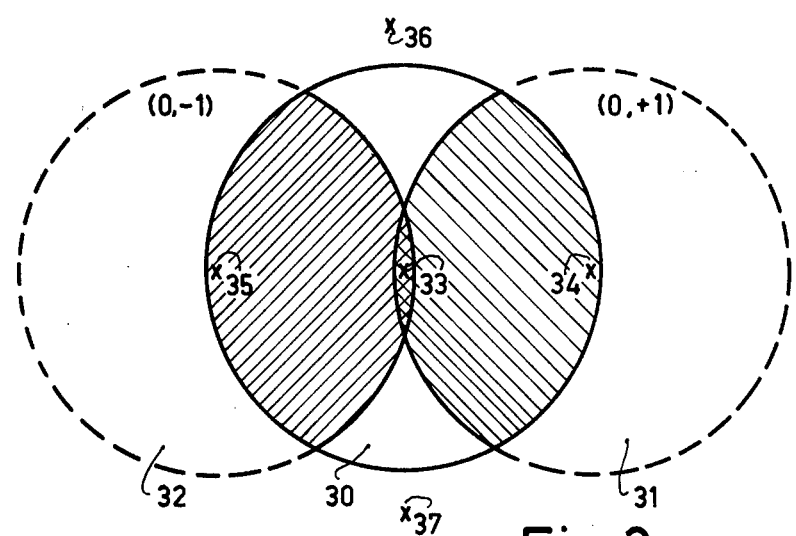

The grating g divides a read beam b into a zero-order beam $b(0,0)$ and two first-order beams $b(0,+1)$ and $b(0,-1)$, and a number of higher-order beams, not shown. The zero-order beam in itself does not comprise any information about the position of the grating; this information is distributed over the beams of the other orders. When the pupil of the lens L is sufficiently large, all orders together provide an accurate image (g') of the grating g in the image plane of said lens. In said image plane the individual orders cannot be distinguished. However, in the plane v of the exit pupil of the lens L, the orders are more or less separated. FIG. 3 represents the situation in said plane.

The circle 30 with the center 33 in FIG. 3 represents the section of the beam $b(0,0)$ in the plane of the exit pupil, and the circles 31 and 32 the sections of the beams $b(0,+1)$ and $b(0,-1)$ respectively. The distances of the centers 34 and 35 of the circles 31 and 32 respectively to the center 33 is determined by the period $p_r$ of the information pattern in the lateral direction of the tracks. The angle β, compare FIG. 2, between the chief ray of the beam $b(0,0)$ and the chief rays of the beams $b(0,+1)$ and $b(0,-1)$ is given by:

$$\sin \beta = \lambda/p_r,$$

where λ represents the wavelength of the radiation of the read beam.

In the shaded areas in FIG. 3 the beams $b(0,+1)$ and $b(0,-1)$ partly overlap the beam $b(0,0)$ and interference occurs. Owing to focussing errors and centering errors variations occur in the phases of the beams $b(0,+1)$ and $b(0,-1)$. This results in intensity variations in the effective exit pupil, which variations can be measured with suitably disposed detectors.

In addition to the beams shown in FIG. 2, beams of the orders (+1,0) and (−1,0) will occur when the information structure is illuminated. The cross-sections of these beams in the plane of the exit pupil consist of circles with centers 36 and 37 and with the same radius as the circles 30, 31 and 32. These beams are caused by the information areas in the track. The phase variations in these beams as a result of the movement of the areas relative to the read beam are of a high frequency, for example 1–10 MHz, and their effect on the low-frequency focussing and centering error signals, for example from 0–30 kHz, is negligible.

FIG. 3 is a fairly good representation of the situation when an information structure with a period $p_r$ of 1.66μm is read with helium-neon laser radiation ($\lambda$ = 0.63μm), an objective with a numerical aperture N.A. = 0.4 being used. The overlapping area of three orders around point 33 is comparatively small.

FIGS. 4a, 4b, 4c and 4d show the variation of the phases of the beams $b(0,+1)$ and $b(0,-1)$ relative to the phase of the beam $b(0,0)$. The electric field vector $\overline{E}_{0,0}$ of the beam $b(0,0)$ rotates with the frequency of light, which is also the case with the electric field vectors of the beams $b(0,+1)$ and $b(0,-1)$. For a specific position of the center of the read spot relative to the center of the track to be read, the beam $b(0,+1)$ has a phase vector $\overline{p}$, which makes a certain angle with the vector $\overline{E}_{0,0}$. The beam $b(0,-1)$ then has a phase vector $\overline{q}$ at the same angle as the vector $\overline{p}$. When the read spot moves over the information pattern in the lateral direction of the tracks, for example from left to right in FIG. 2, the phase angle of the beam $b(0,+1)$ will decrease and the phase angle of the beam $b(0,-1)$ will increase. Consequently, the vectors $\overline{p}$ and $\overline{q}$ will rotate in opposite directions.

Figure 4A:
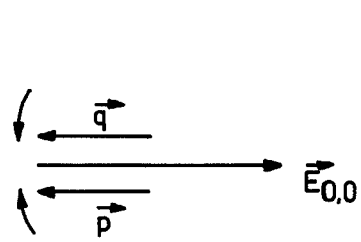
Figure 4B:
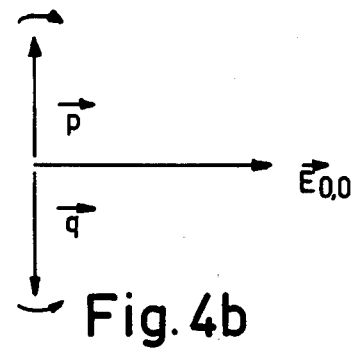
Figure 4C:
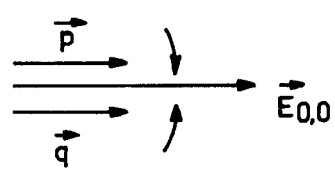
Figure 4D:
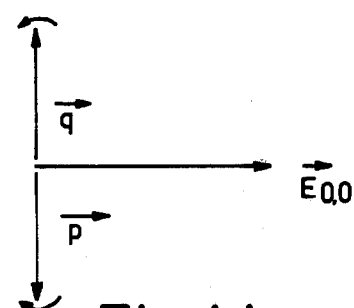

Starting from an initial situation as shown in FIG. 4a, the situation of FIG. 4b will occur after the read spot has moved over a distance which equals a quarter of the track period $p_r$. FIG. 4c shows the situation after the read spot has moved over a distance equal to half a track period $p_r$, and FIG. 4d the situation after a distance has been covered which equals three quarters of the track period $p_r$. After the read spot has moved a full track period $p_r$ the situation of FIG. 4a is restored.

The component of the vector $p$ in the direction of the vector $\overline{E}_{0,0}$ increases from a minimum to 0 (FIG. 4b), then becomes a maximum (FIG. 4c) and finally becomes zero again. The component of the vector $\overline{q}$ in the direction of the vector $\overline{E}_{0,0}$ exhibits the same variation. As the read spot moves in the lateral direction of the tracks constructive and destructive interference will occur alternately in the common areas of the circles 30 and 31 and those of the circles 30 and 32. By measuring the radiation intensity at a radiation-sensitive detector which is disposed in one of the common areas and by comparison with a reference value, the degree of centering of the read spot can be determined.

In FIG. 4a a specific initial position for the phase vectors $\overline{p}$ and $\overline{q}$ has been assumed. This initial position is determined by an optical characteristic of the information structure, namely in the case of a phase structure the difference in optical path length caused by the information areas, and thus also by the tracks, in the read beam, and by the ratio of the surface area of an information area, for example a pit, to the surface area of the surrounding belonging to said area at the information structure. The phase vector diagram of FIG. 4a applies to the case that a record carrier is read whose tracks cause a difference in optical pathlength of half a wavelength of the read radiation in the read beam. For the radiation-reflecting information structure consisting of pits and adjoining air, this means that the pits must be a quarter wavelength deep. Furthermore, it is to be noted that a vector diagram like that of FIG. 3 also applies in the case that a record carrier with a so-called black-white information pattern, i.e. and absorption pattern, is read.

The phase difference between the beam $b(0,0)$ and the beams $b(0,+1)$ and $b(0,-1)$ in the areas of overlap of FIG. 3, is, in addition to the nature of the information structure and the degree of centering, also determined by the degree to which the read beam is focussed on the plane of the information structure. This will be explained with reference to FIG. 5.

Figure 5:
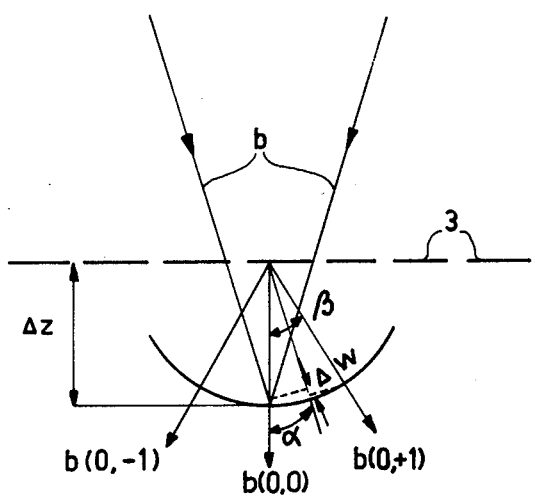

In this Figure a part of information pattern is shown in radial section. The read beam is focussed in a plane which is disposed at a distance $\Delta z$ from the information pattern. Owing to said defocussing an additional difference in pathlength is obtained between the beam $b(0,0)$ and the beams $b(0,+1)$ and $b(0,-1)$. Only the chief rays of these beams are shown in FIG. 5. For the direction at an arbitrary angle $\alpha$ with the chief ray of the beam $b(0,0)$, the difference in pathlength between the beam $b(0,0)$ and the beam $b(0,+1)$ is given by:

$$\Delta w = \Delta z \cos\alpha - \Delta z \cos(\beta - \alpha)$$

For a small angle $\alpha$ and for a small difference of the angles $(\beta - \alpha)$, the pathlength difference in close approximation, i.e. with third-order accuracy, equals:

$$\Delta w = \Delta z \left[1 - \frac{\alpha^2}{2} - \left(1 - \frac{(\beta-\alpha)^2}{2}\right)\right]$$

or:

$$\Delta w = \Delta z \frac{\beta}{2}(\beta - 2\alpha)$$

The phase difference caused by the defocussing in a direction at an angle $\alpha$ to the optical axis of the objective system is then:

$$\Delta Q \Delta z = 2\pi \frac{\Delta w}{\lambda} = 2\frac{z}{\pi}\frac{\Delta z}{\lambda}\beta\left(\frac{\beta}{2} - \alpha\right)$$

The phase difference $\Delta\phi_{\Delta z}$ is a linear function of the angle $\alpha$ and may be represented by a straight line, which passes through zero for $$\alpha = \frac{\beta}{2}.$$

Figure 6:
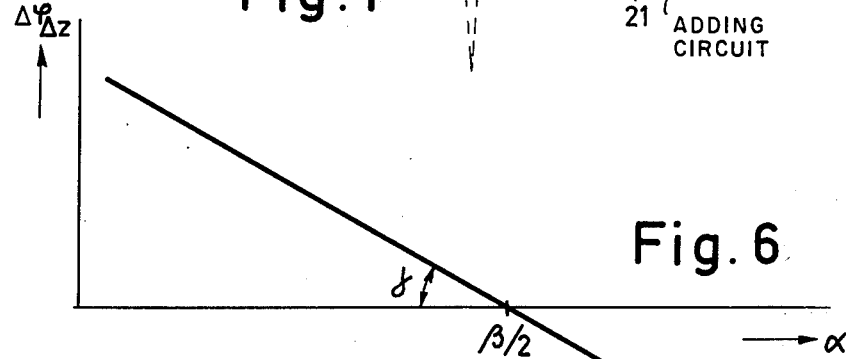
Figure 7:
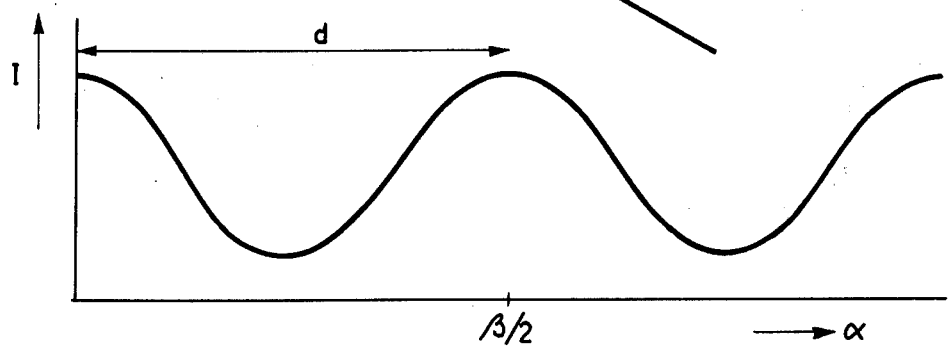

In FIG. 6 $\Delta\phi_{\Delta z}$ is shown for a specific value of $\Delta z$. The slope of the line is given by: $\tan\alpha = c.\Delta z$, where the constant $c = 2\pi/\lambda\beta$. As a result of the phase variation shown in FIG. 6 an intensity distribution I as shown in FIG. 7 is obtained in the exit pupil of the objective system. The spatial frequency of the periodical intensity variation is a function of $\Delta z$. The distance $d$ is inversely proportional to $\Delta z$. At increasing focussing errors the spatial frequency of the intensity pattern will increase. The effect of a focussing error $\Delta z$ on the radiation intensity differs for different positions in the exit pupil.

Figure 8:
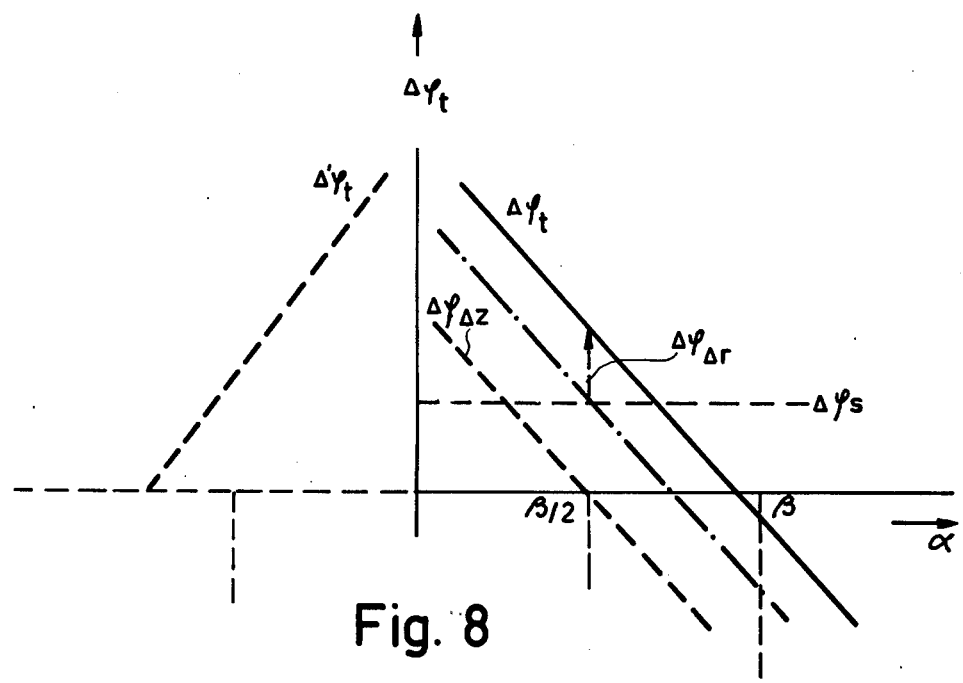

FIG. 8 represents the total phase difference $\Delta\phi_t$ between the beam $b(0,0)$ and the beam $b(0,+1)$ as a function of the angle $\alpha$. This total phase difference is the sum of: 1. The constant phase difference $\Delta\phi_s$ owing to the nature of the information structure (the depths of the pits and the ratio of the surface area of a pit to the surface area of the surrounding belonging to said pit at the information structure). 2. The phase difference $\Delta\phi_{\Delta z}$ which depends on the degree of centering, which difference is independent of the angle $\alpha$. 3. The phase difference $\Delta\phi_{\Delta z}$ which depends on the degree of focussing and on the angle $\alpha$.

Figure 9:
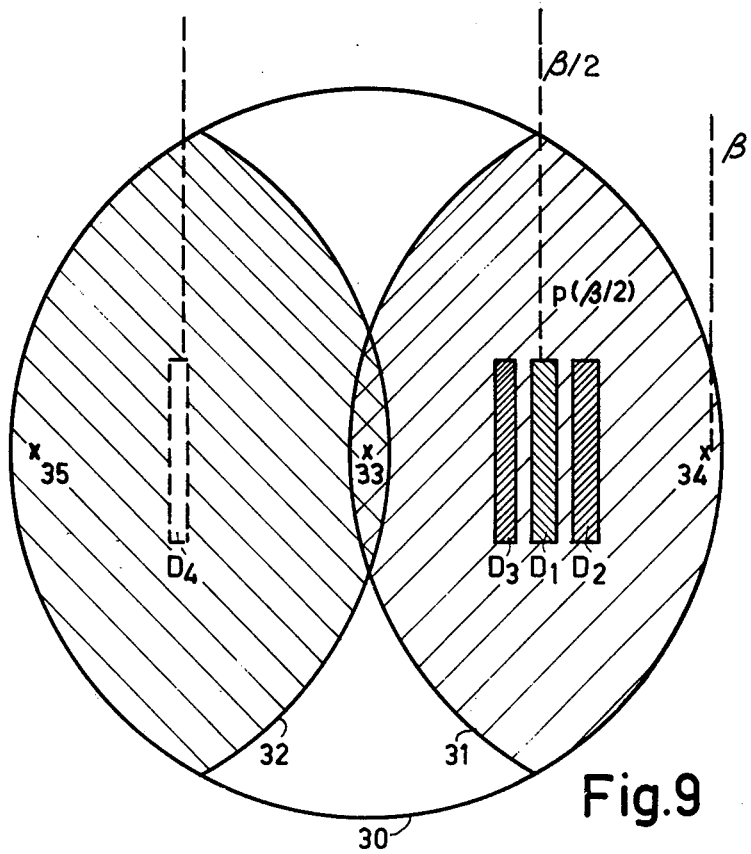
Figure 10:
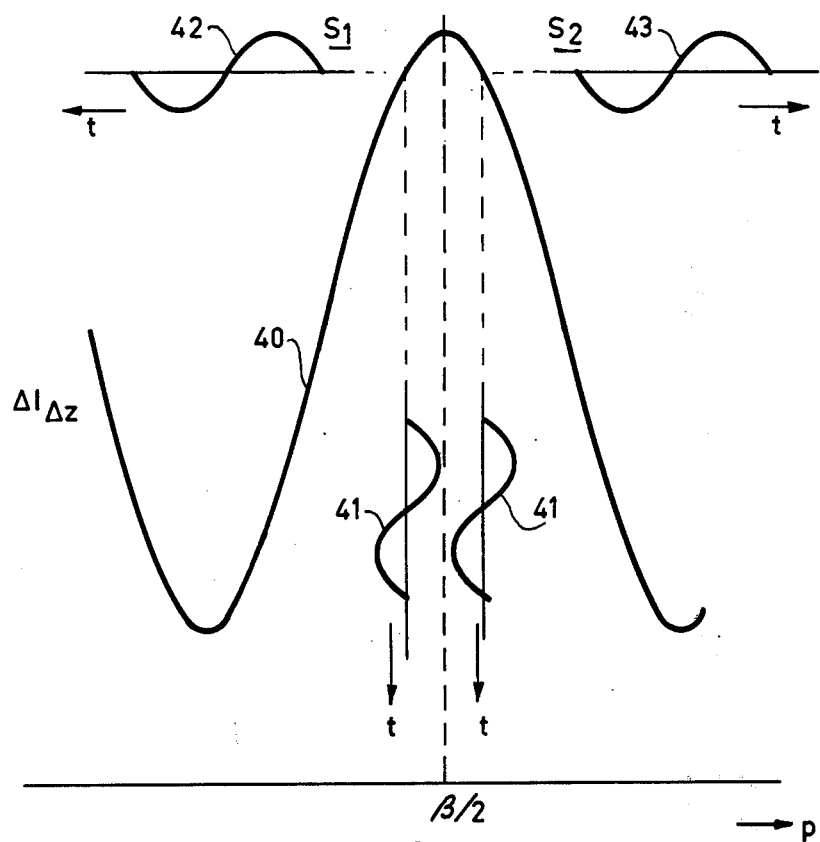
Figure 16:
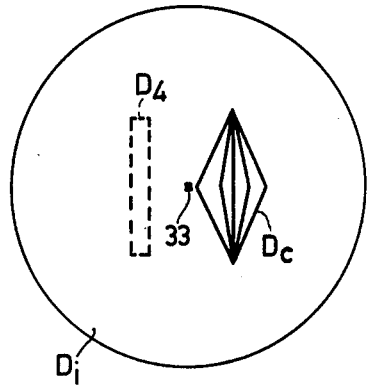

When reading a record carrier care must be taken that in the entire area of overlap the phase difference between the beam $b(0,0)$ and the beam $b(0,+1)$ should as closely as possible approximate $\Delta\phi_s$, i.e. that $\Delta\phi_{\Delta z}$ and $\Delta\phi_{\Delta x}$ are zero, because the read beam is then centered and focussed to an optimum extent. A specific phase difference $\Delta\phi_s$ corresponds to a specific radiation intensity in the area of overlap of these beams. Whether the desired focussing and centering adjustment is achieved can be ascertained in the present example, in which the pits cause a phase difference of $\pi$ rad, by measuring the radiation intensity in one half of the far field. FIG. 9 shows a detector arrangement for this purpose.

In this Figure, like in FIG. 3, the effective exit pupil of the objective system is represented by the circle 30, while the circles 31 and 32 represent the cross-section of the beams $b(0,+1)$ and $(b0,-1)$ in the plane of the exit pupil. In the case that a reflecting record carrier is read and the objective system is disposed in the path of the modulated read beam, only those parts of the beams $b(0,1)$ and $b(0,-1)$ which fall inside the circle 30 will be transmitted. According to the invention a first radiation sensitive detector $D_1$ is disposed in the far field of the information structure at the location $p(\beta/2)$, which location is determined by the angle $\beta/2$. The radiation intensity on this detector is independent of the degree of focussing. As long as the period $d$ is sufficiently great relative to the width of the detector $D_1$, i.e. as long as $\Delta z$ is small, the output signal of the detector will only depend on the centering of the read spot relative to the track to be read. The output signal of the detector D1 might be compared with the value which this signal would have if there only were a phase difference $\alpha\phi_s$ between the beams $b(0,0)$ and $b(0,+1)$. With the control signal $S_r$ (compare FIG. 1) thus obtained the position of the read spot relative to the track to be read can be corrected, for example with the aid of the tilting mirror 9, in such a manner that the signal $S_r$ becomes zero.

The phase difference in the exit pupil is then only determined by $\Delta\phi_s$ and $\Delta\phi_{\Delta z}$ (compare the dash-dot line of FIG. 8). The phase difference as a result of the defocussing could be detected according to the invention by means of a second detector (a focussing detector) $D_2$ which is disposed adjacent to the first detector $D_1$. The output signal of the detector $D_2$ may be compared with the value which this signal would have if there were only a phase difference $\Delta\phi_s$ between the beams $b(0,0)$ and $b(0,-1)$. The control signal $S_f$ thus obtained enables the focussing to be corrected, for example in the manner shown in FIG. 1, until the signal $S_f$ is zero. The read beam is then also sharply focussed on the information structure.

Another focussing detector $D_3$ may be disposed at the other side of the detector $D_1$. By adding the output signals of the detectors $D_3$ and $D_2$ the focussing error signal may be increased by a factor 2, so that a better signal-noise ratio is obtained.

The described error detection may be substantially improved when use is made of a record carrier whose tracks undulate in the plane of the information structure, i.e. exhibit periodical excursions viewed in their lateral direction. The amplitude of the excursions must be smaller than the track width, while the period of the undulation must be substantially greater than the average period of the pits in the tracks. Such a record carrier has already been described in the Applicant's previous U.S. Patent Application U.S. Ser. No. 442,396, filed Feb. 14, 1974. Owing to the undulation of the tracks an additional modulation is impressed on the output signals of the detectors $D_1$, $D_2$ and $D_3$, so that dynamic detection is possible.

If the read beam is not fully centered on the track to be read, the output signal of the detector $D_1$ contains a first component with a frequency of for example 30 kHz, which corresponds to the spatial frequency of the undulation. However, once the read beam is correctly centered, said first component will no longer be present in the detector signal, but a second component is left with a frequency which corresponds to twice the spatial frequency of the undulation. When a record carrier is used with undulating tracks the centering in the read apparatus of FIG. 1 can be corrected so that said first component has disappeared from the signal of the detector $D_1$. So-called synchronous detection is then applied in the circuit 18.

The direction of a centering error which occurs can be determined by comparing the phase of the first component with a reference phase. In the case of a television program stored on the record carrier, steps can be taken to assure that the tracks have excursions only at those locations which correspond to the line synchronizing pulses in the television signal. The reference phase for determining the direction of a centering error can then be derived from the television signal.

The use of a record carrier with undulating tracks also enables a dynamic detection of focussing errors. This can be explained with reference to FIG. 10. In this Figure the curve 40 represents the intensity variation $\Delta I_{\Delta z}$ in the far field of the information structure for a specific value of the defocussing $\Delta z$ and as a function of the position $p$ in the far field. The curve 41 represents the intensity variation in the far field as a result of an undulating track as a function of time $t$. For a radiation sensitive detector which is disposed to the left of the position $p(\beta/2)$, the detector signal $(s_1)$ is time modulated in accordance with the curve 42, while for a detector which is disposed to the right of the position $p(\beta/2)$ the detector signal $(s_2)$ will vary in time in accordance with the curve 43. The signals $s_1$ and $s_2$ exhibit a phase difference of 180°. This phase difference remains as long as the read beam is not sharply focussed on the information structure, i.e. as long as $\Delta z$ is not zero. From the difference of $s_1$ and $s_2$ the magnitude and direction of the defocussing can be derived. Said difference signal will be great for high values of $\Delta z$, for $s_1$ and $s_2$ are then great and their differencewill be twice as great as $s_1$ or $s_2$ when the detectors are disposed symmetrically relative to the position $p(\beta/2)$. For small values of $\Delta z$ the difference signal will decrease. The difference signal will be zero when the information structure is in focus, for in that case the curve 40 will pass into a straight line parallel to the p-axis. An advantage of this is that also in the case of small focussing errors a fairly large error signal is available, because the signals $s_1$ and $s_2$ are subtracted from each other.

When reading a record carrier with undulating tracks using a detector arrangement as in FIG. 9, the centering is corrected first in such a way that the signal of the detector $D_1$ contains no component with a frequency which corresponds to the spatial frequency of the undulation. Subsequently, the focussing is corrected until the difference of the signals supplied by the detectors $D_2$ and $D_3$ is zero.

Dynamic detection of focussing and centering errors may also be achieved by periodically moving the read spot over the information structure in the lateral direction of the tracks, the amplitude of the movement again being small relative to the width of the tracks. Such a movement, which can be achieved by periodically moving the tilting mirror 9 in the apparatus of FIG. 1, has the same effect as undulating tracks.

When the focussing and centering detection were described, only first-order beams were mentioned. It is obvious that the grating like information structure will also cause higher-order diffraction of the radiation. However, the radiation energy in the higher-order beams is fairly low and the diffraction angles are such that only a small part of the higher order beams falls within the pupil of the objective system. For the detection methods described the higher order beams may be neglected.

The arrangement described so far is in principle only suited for reading a record carrier whose pits or information areas have a phase depth $\pi$, i.e. cause a phase difference of $\pi$ rad in the read beam. If the pits have a different depth, a deviation in the centering may occur, while no error is detected by the detectors $D_1$, $D_2$ and $D_3$. The servo-system for the centering then effects such a control that the center of the read spot remains at a constant distance from the center line of a track to be read.

According to the invention it is possible to detect whether the information areas have the correct phase depth $\pi$, by disposing an additional detector $D_4$, shown dotted in FIG. 9, in the far field. In the right part of FIG. 11 $N_1$ denotes the intensity level in the right part of the far field, if the detectors $D_1$, $D_2$ and $D_3$ have signalled no errors. When the pits of the information structure have a phase depth which differs from $\pi$, a different intensity level will exist in the left part of the far field, denoted by $N_2$. The dotted line 44 through the point 33 marks the demarcation between said left and right parts. The difference between the levels $N_1$ and $N_2$ provides an indication of the deviation between the actual phase depth and the phase depth $\pi$ of the pits. This difference in intensity levels may be used for changing a control voltage in the servo-control electronics in such a manner that the read spot is positioned so relative to the track to be read that the intensity levels in the left and right part of the far field are equal, compare level $N_3$ in FIG. 11.

The deviation between the actual phase depth of the pits and the value $\pi$ can be measured, after such control that the detectors $D_1$, $D_2$ and $D_3$ indicate no errors, by comparing the output signals of the detectors $D_4$ and $D_1$. If the record carrier which is being read has undulating tracks, or if during reading the read spot is periodically moved in the lateral direction of the tracks, said deviation may also be derived from the signal of the detector $D_4$ only, namely from the quotient $c(\Omega)/c(2\Omega)$. $2(\Omega)$ and $c(2\Omega)$ are the components of the detector signal of the frequency $\Omega$ and $2\Omega$ respectively, $\Omega$ corresponding to the spatial frequency of the track undulation or to the frequency with which the read spot is moved.

The additional control by means of the detector $D_4$ will not be strictly necessary when only record carriers of a specific type which are assumed to have a specific phase depth are to be read. Fairly large deviations in the phase depths of the pits may occur without impairing the read process. Only when these deviations approximate half the desired phase depth, correct reading will no longer be possible. Such large deviations will hardly ever occur with the present technologies used in the manufacture of record carriers. The additional control is therefore intended to enable, in addition to record carriers with a phase depth $\pi$, other record carriers with an intentional differently selected phase depth to be read as well. When the record carrier is initially read the phase depth is determined first in the previously described manner and the control voltage in the servo system for the centering is adjusted. This adjustment further remains unchanged during reading of the complete information structure.

It is obvious that in the left and right part of the far field the same situations are obtained. Therefore, the arrangement of FIG. 9 can be modified so that the detectors $D_1$, $D_2$ and $D_3$ are disposed at the left and the detector $D_4$ at the right. The position of the detector $D_4$ in its half of the far field and its dimensions are noncritical. In FIG. 9 this detector is only shown in position $p(-\beta/2)$ by way of example.

Figure 12A:
Figure 12B:
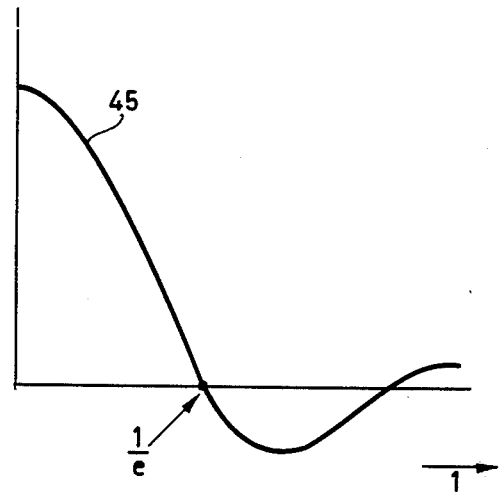

So far it has been assumed that the detectors have a rectangular shape, compare FIG. 12a. With these detectors an intensity variation in accordance with FIG. 7 must be detected, an intensity variation whose spatial frequency is a function of $\Delta z$ and thus variable. The response, or the Fourier transform of a rectangular detector having a width $e$, to such an intensity variation as a function of the spatial frequency $(1/d)$ is represented by the curve 45 of FIG. 12b and has a sin x/x shape. At a frequency 1/e the curve passes through zero, because then the detector will always "see" one period of the intensity variation and will always receive the same amount of radiation, independently of the phase of the intensity pattern and thus independently of the centering. When the spatial frequency of the intensity pattern of FIG. 7 becomes smaller than 1/e, a negative part is obtained in the curve 45 of FIG. 12b. This means that the centering servo system will control in the wrong direction and that a centering error, if any, is increased. It is possible that the servo-system ensures that the center of the read spot remains at a fixed distance from the center line of the track to be read.

Figure 13A:
Figure 13B:
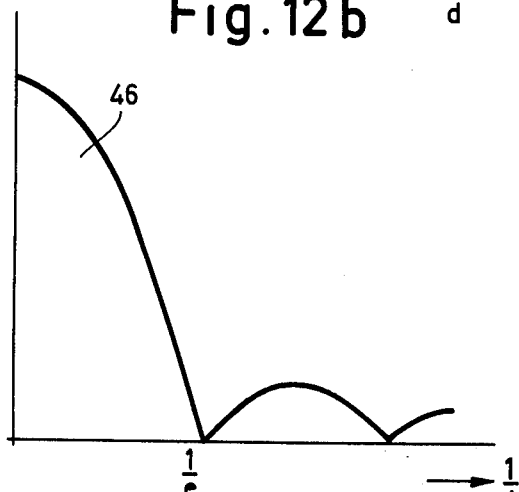

In order to avoid this problem it is possible according to the invention to employ a detector $D'$ of triangular shape (see FIG. 13a). The response of such a detector to the intensity pattern of FIG. 7 is a square function, a $(\sin x/x)^2$ function, see FIG. 13b. The curve 46 comprises no negative portion, and there is no risk that the servo-control for centering controls in a wrong direction.

The detector system for determining focussing and centering error need not consist of separate focussing detectors and separate centering detectors. FIG. 14a shows a different (preferred) embodiment for rectangular and FIG. 14b for triangular detectors. The system consists of two oppositely disposed detectors 50 and 51, and 52 and 53 respectively, which are disposed in or substantially in position $p(\beta/2)$. The signals from the detectors 50, 51 and 52, 53 respectively are applied to both an adder circuit 54 and to a differential amplifier 55. At the output of the circuit 54 a signal $s'$ is obtained with which the centering can be corrected, and at the output of the differential amplifier 55 a signal $s''$ is obtained with which the focussing can be corrected.

As previously stated, the width $e$ of the detector of FIG. 12a should not equal the spatial period $d$ of the intensity pattern, because in that case the centering control will not function any longer. For large focussing errors $d$ is small and for a large control range a narrow detector is to be selected. However, for small focussing errors $d$ is large and for an accurate detection the detector must be wide. In order to comply with this contrary requirements it is possible according to the invention to employ a detection system in accordance with FIG. 15. Said system, which is a special embodiment of the detection system of FIG. 14b, consists of two detectors 52 and 53 which are each divided into two sub-detectors $A_1$ and $a_1$, and $A_r$ and $a_r$ respectively. The signals from the detectors $a_1$ and $A_1$ and those of the detectors $a_r$ and $A_r$ may be added to each or not, which possibilities are schematically represented by the switches 56 and 57.

When a large focussing error is measured switches 56 and 57 interrupt the circuit and controlling takes place in response to the signals of the detectors $a_1$ and $a_r$ only. When the focussing error decreases below a specific value, the switches 56 and 57 are closed and the complete radiation-sensitive areas of the detectors 52 and 53 are utilized.

In an embodiment of a detection system in accordance with FIG. 15, in which the largest width of the detectors 52 and 53 was 850μm and that of the sub-detectors $a_1$ and $a_r$ 425μm, focussing errors to a maximum of 45μm could be detected with the detectors $a_1$ and $ar_r$. When the focussing errors became smaller than 10μm, the parts $A_1$ and $A_r$ were switched on.

It is evident that a rectangular detection system in accordance with FIG. 14a may also be divided in a manner similar to that of FIG. 15.

The focussing and centering detectors cover only a small portion of the far field of the information structure. The rest of this far field can be covered by the detector with which the stored information, for example a television program, is read, or in other words by the detector with which the interference between the beam $b(0,0)$ and the beams $b(+1,0)$ and $b(-1,0)$ is measured. In the far field of the information structure one round radiation-sensitive detector may then be disposed, whose diameter is equal to or greater than the beam diameter at the location of the detector, which detector comprises separate radiation-sensitive sections $D_i$ and $D_c$. Compare FIG. 16. Section $D_i$ serves for reading the information stored on the record carrier, and the section $D_c$, which may have the shape of the detection system of FIG. 15 supplies the focussing and centering error signals. As the case may be, another separate detector section $D_4$ may be provided.

The detector section $D_i$ has a fairly large area. To enable high-frequency information to be read with the detector which has a high capacitance per unit of area, an arrangement as in FIG. 17 may then be chosen. The system 52, 53 for detecting focussing and centering errors is disposed in the far field of the information structure, while the high-frequency information detector 12 is disposed in or substantially in the plane of imaging of the information structure. However, it is alternatively possible to use a so-called PIN photodiode for the detector of FIG. 16. This diode has a low capacitance per unit of area. The advantage of a large detector is that it need not be aligned as accurately as a small detector.

Figure 17:
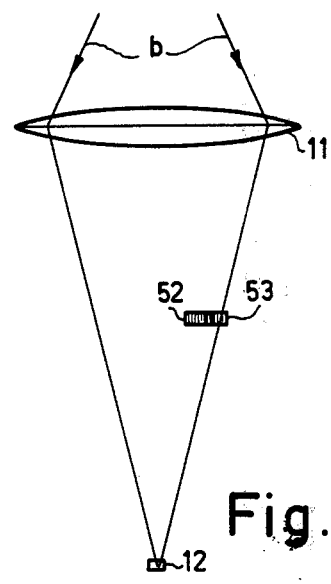
Figure 11:
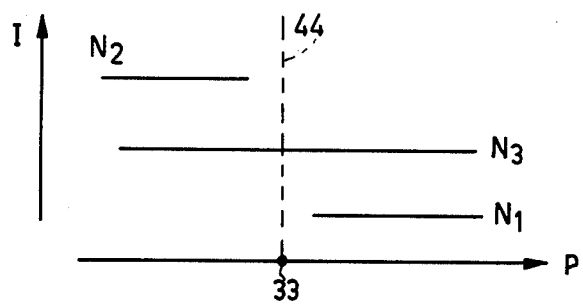

In the arrangement of FIG. 17 a semi-transparent mirror may be included in the radiation path to the detector 12 and the detectors may be disposed in the path of the radiation which is reflected by said mirror.

What is claimed is:
1. An apparatus for reading a flat record carrier on which information, for example video and/or audio information, is stored in an optically readable track-shaped information structure, which apparatus comprises a radiation source, an objective system means for supplying radiation from the radiation source via the record carrier to radiation-sensitive information detection means for converting the read beam which is supplied by the radiation source and modulated by the information structure into an electric signal, and which apparatus further comprises a focussing detection means for providing a signal corresponding to the distance between the focal point of said read beam and the track-shaped structure measured along said read beam, and a centering detection means providing a signal corresponding to the eccentricity between the center of the read beam and the center of a track on which said read beam is directed, said focussing detection means and centering detection means being connected to electronic circuits for deriving control signals for correcting the focussing of the objective system and respectively the centering of the read beam relative to a track portion to be read, characterized in that the centering detection means and the focussing detection means are constituted by a system of at least two radiation-sensitive detectors, which said at least two radiation sensitive detectors being disposed in the far field of the information structure at one side of a plane which is formed by the optical axis of the objective system means and a line which is parallel to the center line of the track portion to be read, said at least two radiation sensitive detectors being situated in an area around the point where the line which makes an angle of $\beta/2$ with the optical axis intersects the plane of the detectors, where $\beta$ is the angle at which a first-order beam is diffracted in the lateral direction of the tracks.

2. An apparatus as claimed in claim 1, wherein at the other side of the plane which is formed by the optical axis of the objective system means and a line parallel to the center line of the track portion to be read, a further radiation-sensitive detector is disposed in the far field of the information structure.

3. An apparatus as claimed in claim 1, wherein the detectors of the centering and focussing detection means are disposed in a plane which is nearer to the objective system than the plane in which the information detector is disposed.

4. An apparatus as claimed in claim 1, wherein the centering and focussing detection means are constituted by two detectors which are each triangular, a bounding line of which detectors is effectively parallel to the center line of a track portion to be read and is disposed in an area around the point where the line which makes an angle of $\beta/2$ with the optical axis intersects the plane of the detectors, while the two other bounding lines of the detectors effectively make an acute angle with the center line of the track portion to be read, the output of each of the detectors being connected to a differential amplifier and to a summation amplifier, the differential amplifier supplying a focussing error signal and the summation amplifier a centering error signal.

5. An apparatus as claimed in claim 4, wherein each of the triangular detectors is divided into two sub-detectors, the dividing lines effectively making a more acute angle with the center line of the track portion to be read than the bounding lines of the composite detector.

6. An apparatus as claimed in claim 1, wherein in the far field of the information structure one integrated radiation-sensitive detector is disposed with dimensions which at least equal the beam cross-section at the location of the detector, which integrated detector comprises mutually separated detector sections of which a first comparatively large section constitutes the information detection system and a second, smaller section supplies the focussing and centering error signals.

7. An apparatus as claimed in claim 6, wherein the integrated detector is constituted by a PIN photodiode.

8. An apparatus as claimed in claim 1, wherein the centering detection means consists of a first radiation-sensitive detector which is disposed in an area around the point where the line which makes an angle of $\beta/2$ with the optical axis intersects the plane of the detectors, and that the focussing detection means is formed by at least one further radiation-sensitive detector which is disposed adjacent to the first detector.

9. An apparatus as claimed in claim 8, wherein the focussing detection means consists of two radiation-sensitive detectors disposed at either side of the first detector, whose outputs are connected to an adder circuit.

10. An apparatus as claimed in claim 8, in which during reading the read beam and the tracks are periodically moved relative to each other in the lateral direction of the tracks, wherein the focussing detection means consists of two radiation-sensitive detectors which are disposed at either side of the first detector, whose outputs are connected to a differential amplifier.

* * * * *

UNITED STATES PATENT AND TRADEMARK OFFICE
CERTIFICATE OF CORRECTION

PATENT NO. : 4,006,293
DATED : February 1, 1977
INVENTOR(S) : GIJSBERTUS BOUWHUIS ET AL It is certified that error appears in the above-identified patent and that said Letters Patent are hereby corrected as shown below:

Col. 3, line 41, "lengthof" should be --length of--;

Col. 5, line 33, "p" should be --$\bar{p}$--;

Col. 6, line 47, "c = $2\pi/\lambda$ β" should be --c = $\frac{2\pi}{\lambda}\beta$--;

Col. 8, line 51, "differencewill" should be --difference will--;

Col. 11, line 52, "the" should be --a--;

Signed and Sealed this nineteenth Day of July 1977

[SEAL]

Attest:

RUTH C. MASON
*Attesting Officer*

C. MARSHALL DANN
*Commissioner of Patents and Trademarks*